United States Patent
Vleghert

(10) Patent No.: US 7,985,779 B2
(45) Date of Patent: Jul. 26, 2011

(54) MANUFACTURE OF POLYURETHANE FOAM BALL

(75) Inventor: Johannes C. Vleghert, DG Dordrecht (NL)

(73) Assignee: Invista North America S.A.R.L., Wilmington, DE (US)

(*) Notice: Subject to any disclaimer, the term of this patent is extended or adjusted under 35 U.S.C. 154(b) by 50 days.

(21) Appl. No.: 12/174,208

(22) Filed: Jul. 16, 2008

(65) Prior Publication Data

US 2009/0023525 A1     Jan. 22, 2009

Related U.S. Application Data

(60) Provisional application No. 60/950,914, filed on Jul. 20, 2007.

(51) Int. Cl.
*C08G 18/38* (2006.01)
(52) U.S. Cl. ............ 521/128; 156/245; 428/423.1; 473/606; 521/121; 521/124; 521/126; 521/127; 521/129; 521/130; 521/131; 521/163; 521/170
(58) Field of Classification Search .......... 521/121, 521/124, 126, 127, 128, 129, 130, 131, 163, 521/170; 156/245; 428/423.1; 473/606
See application file for complete search history.

(56) References Cited

U.S. PATENT DOCUMENTS

| 3,976,295 | A | | 8/1976 | Heald, Jr. | |
|---|---|---|---|---|---|
| 4,114,297 | A | | 9/1978 | Famolare, Jr. | |
| 4,149,720 | A | | 4/1979 | Heald, Jr. | |
| 4,249,730 | A | | 2/1981 | Frisk | |
| 4,318,875 | A | | 3/1982 | Shrimpton et al. | |
| 4,631,298 | A | * | 12/1986 | Presswood | 521/163 |
| 5,558,325 | A | | 9/1996 | Hargis et al. | |
| 6,106,419 | A | | 8/2000 | Hall et al. | |
| 2002/0049099 | A1 | * | 4/2002 | Peter | 473/378 |
| 2004/0262808 | A1 | | 12/2004 | Wu et al. | |
| 2005/0282659 | A1 | | 12/2005 | Kennedy, III et al. | |
| 2009/0318251 | A1 | * | 12/2009 | Limerkens et al. | 473/606 |

FOREIGN PATENT DOCUMENTS

| EP | 06116449.7 | * | 6/2006 |
|---|---|---|---|
| GB | 974986 | | 11/1964 |
| GB | 2008954 | | 6/1979 |
| KR | 2001/0002975 | | 1/2001 |
| WO | WO 2008/000590 | * | 1/2008 |

* cited by examiner

*Primary Examiner* — John Cooney

(57) ABSTRACT

The present invention relates to a novel method for manufacturing a cellular elastomeric polyurethane foam ball. The product polyurethane foam ball may be used as a core for a tennis ball which meets ITF specifications for tennis balls, including weight, diameter, bound, forward deformation and return deformation.

20 Claims, No Drawings

MANUFACTURE OF POLYURETHANE FOAM BALL

BACKGROUND OF THE INVENTION

The present invention relates to a novel method for manufacture of an improved cellular elastomeric polyurethane foam substantially spherical ball, the reaction mixture required by the method, and the product thereof. The present method is commercially expedient and economical. The product elastomeric polyurethane foam ball may be made into a size having excellent properties for use as a tennis ball core, such as, for example, weight, diameter, bound (or rebound), forward deformation (or deflection) and return deformation (or deflection). When elastomeric polyurethane foam balls of the present invention are used as cores for tennis balls, the tennis balls satisfy the strict specifications set by the International Tennis Federation (ITF) for tennis ball acceptability.

Conventional tennis balls are currently manufactured to be felt covered pressurized bladders of elastomeric material which is usually a composition of rubber or rubber-like material, or felt covered non-pressurized rubber or polyurethane foam cores. The pressurized core balls are filled with gas, usually air, at a required pressure, such as for example about 0.7 kg/cm², and lose pressure over time of play and storage. The non-pressurized core balls are manufactured by commercially cumbersome, multi-step processes to give them playability and usually play with a different feel or fail to meet the rigid specifications set by the ITF. Due to the importance of tennis balls meeting the specifications set by the ITF, such as, for example, weight, diameter, bound, forward deformation and return deformation, researchers have tried to achieve these properties by a variety of different methods. Many of such methods and the products comprising the results of such methods, e.g. tennis balls, have troublesome shortcomings or deficiencies which create problems, such as, for example, the ball having insufficient bound making such a ball unacceptable for use in ITF sanctioned play, or having an unusual feel to the player.

Both pressurized and non-pressurized tennis balls can be made to meet specifications of the ITF, such as diameter, weight, bound and forward and return deformation. However, a tennis ball also ideally exhibits long play life and consistency in play behavior over time. Pressurized tennis balls exhibit a relatively short life due to gas permeating through the rubber or rubber-like material defining the core. Many current pressureless tennis balls exhibit longer life than pressurized balls, but are difficult to manufacture with consistent play behavior.

U.S. Pat. No. 6,106,419 relates to a non-pressurized ball, such as a non-pressurized tennis ball. The ball of this patent has a wall of elastomeric material defining a cavity containing a filling which comprises a plurality of substantially closed cells. The ball of this patent is manufactured by inserting a preformed unexpanded material into at least one of a pair of hemispherical half shells; bonding the two half shells together to form a cavity; and expanding the material to form a filling of polymeric microspheres which substantially fill the cavity. More specifically, the manufacturing method comprises a first step of mixing elastomeric materials with different chemical ingredients. The mixture is milled to a smooth consistency and fed into an extruder which forms the mixture into preformed structures. The elastomeric preformed structures are then placed into a multicavity mold. Under pressure and heat, the preformed structures are formed into hemispheres, each of which is one half of a tennis ball core. These halves are edge ground and the edges are coated with adhesive in a double-carousel assembly unit. Pellets containing pure or matrix-bound unexpanded microspheres are added to the half shells on one carousel. The half shells meet, one from each of the carousel units, one containing a pellet and the other being empty. The half shells adhesively tack together before entering a second cure process step. This second cure permanently fuses the halves together forming pressureless complete ball cores.

U.S. Pat. No. 5,558,325 relates to a hollow rubber play ball that uses a combination of two or more fillers to produce predetermined playing properties in a tennis ball. The preferred ball is a pressureless tennis ball. The specific fillers disclosed are mineral type particulate reinforcing fillers such as silica and carbon black, polymeric fillers such as cellulose, a reaction product of grafting polyethylene with cellulose, and ethylene-vinyl acetate copolymers. These fillers can also have surface treatments to enhance the elastomer-filler interaction. Reinforcing filler that can be introduced with the rubber components is the non-rubber constituents in skim rubber that serve to increase the modulus of a compounded rubber.

U.S. Pat. No. 4,249,730 relates to a tennis ball comprising a hollow sphere of natural rubber and/or synthetic rubber similar in resilience properties to natural rubber, the rubber containing filler comprising chrome-tanned leather particles, and the hollow sphere containing a gas having the same or higher pressure than that of the surrounding atmosphere.

U.S. Pat. No. 4,318,875 relates to a process for the production of a core for a tennis ball consisting of a cross-linked, cellular, elastomeric composition derived from a formulation including (i) at least one elastomeric material selected from the group consisting of natural rubber and synthetic rubbers, (ii) a cross-linking agent, (iii) at least one monomeric salt of an ethylenically-unsaturated carboxylic acid and (iv) a blowing agent, wherein the process includes the steps of (a) thoroughly mixing the elastomeric material and the salt without the application of heat thereto; (b) transferring the mixture of step (a) to a cooled mixer and dispersing therein the cross-linking agent and the blowing agent; (c) extruding the mixture of step (b) through a die and cutting the resulting extrudate into slugs; (d) molding each slug in a pre-heated mold and maintaining the mold at the temperature of pre-heating until decomposition of the blowing agent occurs; (e) transferring each molding of step (d) to a second preheated mold and maintaining the second mold at the temperature of preheating until completion of the cross-linking occurs.

U.S. Pat. No. 4,144,297 relates to a method of forming a baseball or softball core comprising forming a flowable homogeneous mass from a thermoplastic resin such as ethylene vinyl acetate copolymer and a blowing agent by the application of heat and pressure thereto in an injection molding machine; injecting the mass into the spherical cavity of a mold cooled to 32° to 65° F. (0 to 18.3° C.) to foam the mass and fill the mold cavity; holding the mass in the mold cavity for a sufficient time to form a non-porous skin on the outer surface of the mass, the skin being of adequate strength to prevent rupture of the skin by blowing agent contained within the mass upon removal of the mass from the mold cavity; removing the mass from the mold; and cooling the mass at an exterior temperature of 32° to 65° F. (0 to 18.3° C.) to produce a game ball core having a dimension substantially the same as the mold cavity.

U.S. Pat. No. 3,976,295 relates to a composite baseball having the appearance, physical characteristics and dimensions of a conventional baseball, the composite baseball comprising a spherical core member formed of flexible and resilient molded polyurethane foam and a cover portion comprising leather stitched over and enclosing the core member wherein the core member is formed of polyurethane foam of such density and resilience as to give the composite ball essentially the same rebound qualities, hardness, size, feel and sound as a conventional baseball.

Korean patent publication KR 2001-0002975 relates to manufacture of a non-pressurized tennis ball having slower speed and lower bound compared to a ball which would meet ITF specifications. The bound (or rebound) of the tennis ball taught by this patent publication is from 110 to 120 cm when dropped from 254 cm onto horizontal, level concrete. The core of this tennis ball comprises a synthetic resin of either polyurethane or ethylene vinyl acetate foam. The core is manufactured in a cumbersome multi-step process to form a spherical ball. Felt is then glued onto the spherical ball to yield a tennis ball with reduced speed and bound for use as a practice ball by beginners, etc.

The techniques and products of the above patent publications are limited in that they either do not teach or suggest a cellular elastomeric polyurethane foam spherical ball, or if they do suggest such a ball, it is manufactured by a commercially difficult or complicated process or it does not provide a core for a tennis ball which satisfies the strict ITF specifications. None of these references teach or suggest a simple, minimal step method for manufacturing a cellular elastomeric polyurethane foam spherical ball which, when used as a core for a tennis ball, enables the tennis ball to meet the ITF specifications for tennis balls, including for example, weight, diameter, bound, forward deformation and return deformation. The ITF specifications for tennis balls include a weight of from 56.70 to 58.47 grams; a diameter of from 65.4 to 68.6 mm; a bound (or rebound) of from 135 to 147 cm when dropped from 254 cm onto horizontal, level concrete; a forward deformation (or deflection) of from 5.59 to 7.37 mm under an 8.17 kg load; and a return deformation (or deflection) of from 8.89 to 10.8 mm at 8.17 kg load on recovery after the ball has been compressed 25.4 mm.

The present invention results in a cellular elastomeric polyurethane foam ball core which, if desired, provides a tennis ball with properties well within the requirements of the ITF specifications for tennis balls. Furthermore, the tennis balls utilizing cores comprising cellular elastomeric polyurethane foam balls manufactured by the present invention are playable for extended periods of time since they do not loose pressure from play or storage.

SUMMARY OF THE INVENTION

Accordingly, it is desirable to provide cellular elastomeric polyurethane foam substantially spherical balls which may, if desired, be used as cores in tennis balls which satisfy ITF specifications and which last for extended playing and storage periods of time.

Therefore, an important embodiment of the present invention provides a commercially expedient method for manufacturing improved cellular elastomeric polyurethane foam substantially spherical balls having excellent properties, such as, for example, weight, diameter, bound, forward deformation and return deformation.

More specifically, an important embodiment of the present invention provides a commercially expedient method for manufacturing improved cellular elastomeric polyurethane foam substantially spherical balls having excellent properties, such as, for example, weight, diameter, bound, forward deformation and return deformation which, when used as cores for tennis balls, provide tennis balls which satisfy the stringent ITF specifications.

Still further, an important embodiment of the present invention is a tennis ball which satisfies the stringent ITF specifications, maintains its playing properties over very long periods of time, and performs consistently at any location regardless of elevation, temperature or humidity.

DETAILED DESCRIPTION

As a result of intense research in view of the above, we have found that we can manufacture an improved polyurethane foam substantially spherical ball having a uniform cross-sectional structure by a novel, commercially expedient method. The product polyurethane foam ball of the present invention has a high closed to open cell ratio indicated by a bound (or rebound) of from about 150 to about 180 cm when dropped from 254 cm onto horizontal, level concrete, and a forward deformation (or deflection) of from about 5 to about 11 mm under an 8.17 kg load. If the product polyurethane foam ball of the present invention is to be used as a tennis ball core, it will have a weight of from about 41 to about 45 grams; a diameter of from about 59 to about 62 mm; a bound (or rebound) of from about 150 to about 170 cm when dropped from 254 cm onto horizontal, level concrete; a forward deformation (or deflection) of from about 6 to about 8 mm under an 8.17 kg load; and a return deformation (or deflection) of from about 9 to about 11 mm at 8.17 kg load on recovery after the ball has been compressed 25.4 mm. A tennis ball utilizing the product polyurethane foam ball of the present invention as a core meets ITF specifications for tennis balls, including a weight of from 56.70 to 58.47 grams; a diameter of from 65.4 to 68.6 mm; a bound (or rebound) of from 135 to 147 cm when dropped from 254 cm onto horizontal, level concrete; a forward deformation (or deflection) of from 5.59 to 7.37 mm under an 8.17 kg load; and a return deformation (or deflection) of from 8.89 to 10.8 mm at 8.17 kg load on recovery after the ball has been compressed 25.4 mm.

The method of this invention for manufacturing a cellular elastomeric polyurethane foam ball comprises (1) forming a reaction mixture comprising a first composition and a second composition inside a spherical mold, (2) maintaining the reaction mixture inside the mold at reaction conditions including a temperature of from about 60 to about 80° C. for a time sufficient to form a cellular elastomeric polyurethane foam ball inside the mold, (3) removing the formed cellular elastomeric polyurethane foam ball from the mold, and (4) curing the formed cellular elastomeric polyurethane foam ball at a temperature for from about 60 to about 80° C. for a time of from about 60 minutes to about 12 hours, the resulting foam ball having a bound (or rebound) of from about 150 to about 180 cm when dropped from 254 cm onto horizontal, level concrete, and a forward deformation (or deflection) of from about 5 to about 11 mm under an 8.17 kg load.

The first composition of the reaction mixture comprises at least one hereinafter described isocyanate compound or modified version thereof. The second composition of the reaction mixture comprises at least one hereinafter described compound containing a functional group which is reactive with the at least one isocyanate compound or modified version thereof of the first composition (the compound containing a reactive functional group may be referred to herein as a polyol); a hereinafter described chain extender; at least one hereinafter described catalyst or catalyst mixture comprising a tertiary amine and, optionally, a metal complex, said metal of the metal complex being selected from the group consisting of tin, titanium, zirconium, zinc, bismuth, mercury, iron and combinations thereof; optionally at least one hereinafter described nonionic surfactant; and at least one hereinafter described blowing agent.

As used herein, the term "polymer" refers to the product of a polymerization reaction, and is inclusive of homopolymers, copolymers, terpolymers, etc.

As used herein, unless specified otherwise, the term "copolymer(s)" refers to polymers formed by the polymerization of at least two different monomers. For example, the term "copolymer" includes the copolymerization reaction product of ethylene and an alpha-olefin ($\alpha$-olefin), such as by way of example propylene and 1-hexene, or an alkylene oxide such as ethylene oxide and tetrahydrofuran. However, the term "copolymer" is also inclusive of, for example, the copolymerization of a mixture of ethylene, propylene, 1-hexene, and 1-octene, or a mixture of various alkylene glycols and tetrahydrofuran.

As used herein, weight percent ("wt. %"), unless noted otherwise, means a percent of a particular component based on the total weight of the mixture or composition containing the component. For example, if a mixture or composition contains three grams of compound A and one gram of compound B, then the compound A comprises 75 wt. % of the mixture or composition and the compound B comprises 25 wt. %. This theory applies for designations of mole percent ("mole %") as well.

First Composition

The first composition of the reaction mixture for use in the present method comprises one or more isocyanate compounds or modified versions thereof, such as, for non-limiting example, methylene diphenylene diisocyanate; modified versions of methylene diphenylene diisocyanate; dimer, trimer and allophanate of hexamethylene diisocyanate; modified versions of dimer, trimer and allophanate of hexamethylene diisocyanate; toluene diisocyanate; and trimer of toluene diisocyanate. Modified versions of isocyanates for use in the first composition include, for non-limiting example, reaction products or mixtures of the isocyanate with a polyol as used in the second composition. One such example is a mixture of the hexamethylene diisocyanate trimer with polyol prepolymer. These isocyanate compounds or modified versions thereof may be used individually or in combination for the first composition of the reaction mixture. These isocyanate compounds are liquid at a temperature above about 55° C. and create the right amount of cross linking and hard segment in combination with other reaction mixture materials. The isocyanate compounds mentioned above for use in the first composition are commercially available from, for example, Bayer, The Dow Chemical Company and Rhodia.

Second Composition

The second composition of the reaction mixture for use in the present method comprises at least one compound containing a functional group which is reactive with the at least one isocyanate compound or modified version thereof of the first composition (a polyol); a chain extender; at least one catalyst or catalyst mixture comprising a tertiary amine and, optionally, a metal complex, said metal of the metal complex being selected from the group consisting of tin, titanium, zirconium, zinc, bismuth, mercury, iron and combinations thereof; optionally at least one nonionic surfactant; and a blowing agent.

The compound containing a functional group which is reactive with the at least one isocyanate compound or modified version thereof of the first composition, i.e. a polyol, may be polytetramethylene ether glycol (PTMEG); alkylene oxide copolymer of ethylene oxide and tetrahydrofuran, i.e. poly(tetramethylene-co-ethyleneether)glycol; polypropylene glycol; polyethylene glycol; or combinations thereof. The PTMEG and alkylene oxide copolymer of ethylene oxide and tetrahydrofuran are available commercially from, for example, INVISTA. The polypropylene glycol and polyethylene glycol are commercially available from, for example, Bayer.

The chain extender for use in the second composition may be an aromatic diamine, such as, for example, 3,5-dimethylthio-2,4-toluenediamine; 3,5-dimethylthio-2,6-toluenediamine; diethyltoluene diamine (DETDA) commercially available from, for example, Albemarle; or combinations thereof. An example of a combination of such chain extenders is an 80/20 mixture of 3,5-dimethylthio-2,4-toluenediamine and 3,5-dimethylthio-2,6-toluenediamine (Ethacure-300) commercially available from Albemarle. Water may also act as a chain extender in this second composition.

The catalyst or catalyst mixture for use in the second composition comprises a tertiary amine and, optionally, a metal complex. The metal of the metal complex is selected from the group consisting of tin, titanium, zirconium, zinc, bismuth, mercury, iron and combinations thereof. A non-limiting example of the tertiary amine for this use is 1,4-diazabicyclo[2.2.2]octane (DABCO® SA1/10 and DABCO crystal) commercially available from Air Products. Non-limiting examples of the metal complex for this use include dibutyl tin dilaurate (DBTDL) commercially available from Air Products; tinoctoate commercially available from Air Products; titanium type catalyst (Vertec® VEXP 0544) commercially available from Johnson Matthey; and bismuth type catalyst BiCAT®, e.g. BiCAT-V, commercially available from The Shepherd Chemical Company. The catalyst or catalyst mixture is designed to direct reaction in step (2) of the present method to obtain the correct foam structure of a high closed to open cell ratio indicated in the product foam ball by a bound (or rebound) of from about 150 to about 180 cm when dropped from 254 cm onto horizontal, level concrete, and a forward deformation (or deflection) of from about 5 to about 11 mm under an 8.17 kg load. The catalyst or catalyst mixture is further designed to provide desirable reaction speed, pot life, cream time and cure time. For this to occur in the reaction mixture comprising the first composition and the second composition at reaction conditions more fully described below, the catalyst or catalyst mixture must provide from about 0.05 to about 0.50 wt. % tertiary amine and from about 0 to about 0.50 wt. % metal complex of that reaction mixture.

The optional nonionic surfactant for use in the second composition of the reaction mixture is not narrowly critical and may be any suitable compound that reduces interfacial tension between the first and second composition components. Suitable nonionic surfactants for use herein may be selected from, for non-limiting example, the group consisting of polydialkylsiloxane; a copolymer of polydialkylsiloxane; polyalkyleneoxide; a copolymer of polyalkyleneoxide; and combinations thereof, said alkyl comprising from 1 to about 4 carbon atoms and said alkylene comprising from 2 to about 4 carbon atoms.

The blowing agent for use in the second composition of the reaction mixture may be, for non-limiting example, water, pentane, carbonic acid or combinations thereof. Water is the preferred blowing agent for the present invention.

The properties of the product cellular elastomeric polyurethane foam ball of the present invention are determined by the components of the reaction mixture in the mold and the ratios between them during reaction in present method step (2). For example, rebound and hardness (at equal weight and density) are controlled by the combination of ingredients such as, for example, the amount of polyol, e.g. PTMEG, in the reaction mixture. The type of isocyanate or isocyanate mixture of the first composition is important for resilience. The type of extender determines the resin hardness as part of the foam hardness and the combination of different types of catalysts determine the cell structure, i.e. closed and open cell content, of the foam and the hardness effect of the foam caused by the closed cell content (the more closed cells the harder the foam). Therefore, the weight ratio of first composition to second composition in the overall reaction mixture placed in the mold will be in the narrow range of from about 18/82 to about 24/76, preferably from about 20/80 to about 22/78. The second composition of the reaction mixture is important and will provide the reaction mixture with the following components in weight %: from about 70 to about 82%, preferably from about 74 to about 77%, polyol; from about 0 to about 6.0%, preferably from about 2.0 to about 3.0%, chain extender; from about 0.1 to about 1.0%, preferably from about 0.2 to about 0.4%, catalyst or catalyst mixture; from about 0 to about 1.0%, preferably from about 0.2 to about 0.3%, nonionic surfactant; and from about 0.2 to about 0.4%, preferably from about 0.27 to about 0.31%, water which may be acting as chain extender and/or blowing agent.

Spherical Mold

The mold for use in the present method will be sized properly to make the size ball desired, such as, for a non-limiting example, a mold having an inside diameter of from about 60 mm to about 62 mm, e.g. about 61 mm, to provide a cellular elastomeric polyurethane foam tennis ball core, and may be constructed of, for example, steel, such as stainless steel, or aluminum. The mold will be of spherical shape, hollow and made of two hemispherical halves. The mold will contain means to allow any gasses formed inside during chemical reaction to escape, e.g. a small vent hole, such as at the top of the mold, of not more than about 1 (+/−) 0.1 mm in diameter. The vent hole allows the foam to expand in the mold, releasing the excess gases through the hole. As soon as the foam enters the hole it is plugged so that the ball properties, e.g. weight, are fixed at that moment. The ball is removed from the mold in method step (3) simply by opening the mold and removing the formed foam ball. Any small tip on the ball caused by foam filling the hole in the mold may be removed, such as by cutting.

Reaction and Cure Conditions

The reaction conditions required for the present method step (2) include a temperature of from about 60 to about 80° C.; and a time sufficient to form a cellular elastomeric polyurethane foam ball inside the mold under these conditions, usually from about 5 to about 20 minutes, strong enough to allow removal of the ball from the mold without damaging the foam. After removal of the foam ball from the mold, it is subjected to an additional cure in method step (4) in an oven at from about 60 to about 80° C. for from about 60 minutes to about 12 hours at atmospheric pressure.

Tennis Ball

Converting the cellular elastomeric polyurethane foam spherical ball manufactured by the present invention into a tennis ball satisfying the specifications required by the ITF involves any one or more of the following steps. The ball removed form the mold and additionally cured may be treated to prevent felt covering adhesion problems in later steps or in use of the tennis ball, for example by means of grinding and/or washing. The resulting ball is then covered with proper felt by any suitable method. In one such method, covers for the ball cores are cut from the felt. The back of the roll of felt and/or the foam ball core is coated with adhesive in a controlled quantity prior to or after cutting cover pieces therefrom. The cover pieces may be edge coated with adhesive which defines the seams of the tennis ball. From the covering operation, the tennis balls are moved to a press to undergo a curing process. The application of heat of from about 50 to about 100° C. in this curing process assures a solid bond between cover and core. Removed from this curing press, the balls may, if desired, then be, for example, steam fluffed to raise the nap of the felt, and dried to form finished tennis balls.

The adhesive used for this tennis ball manufacturing step is any suitable adhesive that provides good adhesion between the cellular elastomeric polyurethane foam core and the felt and may be, for example, Aquabond® 3610 with a viscosity of about 200 mPas (millipascal), or Aquatherm® 3608 with a viscosity of about 7000 mPas, both commercially available from SABA Dinxperlo BV, or a polyurethane solution, or combinations thereof.

The novel cellular elastomeric polyurethane foam substantially spherical ball of the present invention may further comprise, if desired, an effective amount of a stabilizer, such as, for example, to prevent oxidation, added to the reaction mixture of method step (2). Many such stabilizers are known in the art, any of which may be used with the presently disclosed compatibilized product. Among the stabilizers available for use with the present invention are BHT and Irganox®.

The novel cellular elastomeric polyurethane foam substantially spherical ball of the present invention may further comprise, if desired, an effective amount of a colored pigment, added to the reaction mixture of method step (2). Many colored pigments for use with the product of the present invention and mixtures comprising same are known in the art, any of which may be used. Among the pigments available for use with the present invention are carbon black, phthalocyanine blues, phthalocyanine greens, anthraquinone dyes, scarlet 2b Lake, azo compounds, acid azo pigments, quinacridones, chromophthalocyanine pyrrols, halogenated phthalocyanines, quinolines, heterocyclic dyes, perinone dyes, anthracenedione dyes, thiozanthene dyes, parazolone dyes, polymethine pigments and combinations thereof.

The novel cellular elastomeric polyurethane foam substantially spherical ball of the present invention may also be combined with other or additional additives, fillers or compounds, if desired, to provide the compositions with particular, desirable characteristics, added to the reaction mixture of method step (2). Many such additives, fillers and compounds are known in the art. The use of appropriate additives, fillers or compounds is well within the skill of one in the art. Examples of such other or additional additives or compounds include UV stabilizers, anti-oxidants, light stabilizers, flame retardants, antistatic agents, biocides, fragrances, viscosity-breaking agents, impact modifiers, plasticizers, fillers, reinforcing agents, lubricants, mold release agents, blowing agents, nucleating agents and the like.

EXAMPLES

The presently described and claimed invention will be understood more fully by reference to the Examples below without intention of restricting the scope of the present claims. In these Examples, parts are by weight. Also, in these Examples, deformation (or deflection) tests were conducted as follows:

Prior to deflection measurements, product balls were pre-conditioned by compressing the balls to 25.4 mm (1 inch) deflection on each of the three orthogonal axes (x, y and z). All subsequent deflections were also measured along the three orthogonal directions. In the first test to determine the deflection of the ball from rest (forward deformation or forward deflection), the tennis ball was compressed at a rate of 50.8 mm/min (2 inches/min) until a load of 1.36 kg (3 lbs) was achieved, then the load was increased to 9.53 kg (21 lbs) providing a net load of 8.17 kg (18 lbs) and the resultant deflection was measured from the deflection at 1.36 kg load. In a second test the deflection of the ball after a preliminary compression was measured. First, the tennis ball was compressed with such force, while maintaining specific conditions, that the deflection was 25.4 mm (1 inch). Then the load was reduced to 9.53 kg (21 lbs) and the deflection was measured. Then the load was reduced to 1.36 kg (3 lbs) and the deflection was measured again. The reverse deflection was the difference in displacement of the ball at 9.53 kg load and the displacement at 1.36 kg load. The displacement at 1.36 kg load was thus used as either a starting point or ending point for most displacement measurements by difference. The average deflection that now results is greater on account of the greater previous compression of 25.4 mm (1 inch) from which the ball is recovering. This is called return deflection.

Example 1

A reaction mixture comprising a first composition of 14.9 parts of a 54.5 parts methylene diphenylene diisocyanate with 45.5 parts hexamethylene diisocyanate trimer mixture, and 55 parts of a second composition individually comprising about 96.0 parts polytetramethylene ether glycol, about 3.1 parts 80/20 mixture of 3,5-dimethylthio-2,4-toluenediamine and 3,5-dimethylthio-2,6-toluenediamine (Ethacure® 300), about 0.2 parts catalyst mixture of 0.1 wt. % 1,4-diazabicyclo [2.2.2]octane and 0.1 wt. % dibutyl tin dilaurate (DBTDL), about 0.34 parts polydialkylsiloxane, and 0.36 parts water, was placed into a spherical mold, preheated at 70.5° C., as described above having a 61 mm inside diameter and a single 1 mm vent hole therein.

After about 1 minute the hole in the mold plugged and gasses no longer escaped.

After about 15 minutes reaction time in the mold, the mold was opened and the formed cellular elastomeric polyurethane foam ball was removed therefrom. The formed ball was then moved to an oven and held at about 70° C. for 8 hours.

A small tip on the ball caused by foam filling the vent hole in the mold during reaction was removed by cutting.

The ball of this example was a high closed to open cell foam structure exhibiting a diameter of 59 mm; a bound (or rebound) of 152 cm when dropped from 254 cm onto horizontal, level concrete; a forward deformation (or deflection) of 7.9 mm under an 8.17 kg load: and a return deformation (or deflection) of 9.0 mm at 8.17 kg load on recovery after the ball had been compressed 25.4 mm.

Example 2

A tennis ball was made from the formed cellular elastomeric polyurethane foam ball of Example 1 by adhering standard tennis ball felt onto the foam ball as described above. The adhesive used was Aquabond 3610 with a viscosity of about 200 mPas. The tennis ball was then subjected to a curing process at about 75° C. in a curing press for about 1 hour.

Example 3

The tennis ball of Example 2 was tested for weight, diameter, bound and rebound specifications.
Results of the testing were as follows:

Weight was 58 grams; Diameter was 66 mm; Bound was 142 cm when dropped from 254 cm onto horizontal, level concrete; Forward deformation (or deflection) was 7.2 mm under an 8.17 kg load; and Return deformation (or deflection) was 8.9 mm at 8.17 kg load on recovery after the ball has been compressed 25.4 mm.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method for manufacturing a cellular elastomeric polyurethane foam ball which comprises (1) forming a reaction mixture comprising a first composition and a second composition inside a spherical mold, (2) maintaining the reaction mixture inside the mold at reaction conditions including a temperature of from about 60 to about 80° C. for a time sufficient to form a cellular elastomeric polyurethane foam ball inside the mold, (3) removing the formed cellular elastomeric polyurethane foam ball from the mold, and (4) curing the formed cellular elastomeric polyurethane foam ball at a temperature for from about 60 to about 80° C. for a time of from about 60 minutes to about 12 hours, the resulting foam ball having a diameter of from about 59 to about 62 mm, a weight of from about 41 to about 45 g, a bound of from about 150 to about 180 cm when dropped from 254 cm onto horizontal, level concrete, and a forward deformation of from about 5 to about 11 mm, measured by first compressing the ball to a 25.4 mm deformation on each of the three orthogonal axes, then compressing the ball at a rate of 50.8 mm/min until a 1.36 kg load was achieved, increasing the load to 9.53 kg, and measuring the deformation from the 1.36 kg load, said first composition of the reaction mixture comprising at least one isocyanate compound and said second composition of the reaction mixture comprising at least one compound containing a functional group which is reactive with the at least one isocyanate compound of the first composition; a chain extender; at least one catalyst or catalyst mixture comprising a tertiary amine and, optionally, a metal complex, said metal of the metal complex being selected from the group consisting of tin, titanium, zirconium, zinc, bismuth, mercury, iron and combinations thereof; optionally at least one nonionic surfactant; and at least one blowing agent, wherein the chain extender of the second composition comprises an aromatic diamine selected from a group consisting of 3,5-dimethylthio-2,4-toluenediamine; 3,5-dimethylthio-2,6-toluenediamine; diethyltoluene diamine; and combinations thereof.

2. The method of claim 1 wherein the isocyanate compound of the first composition is selected from the group consisting of methylene diphenylene diisocyanate; dimer, trimer and allophanate of hexamethylene diisocyanate; toluene diisocyanate; trimer of toluene diisocyanate; and combinations thereof.

3. The method of claim 1 wherein the compound of the second composition containing a functional group which is reactive with the isocyanate compound of the first composition is selected from the group consisting of polytetramethylene ether glycol; alkylene oxide copolymer of ethylene oxide and tetrahydrofuran; polypropylene glycol; polyethylene glycol; and combinations thereof.

4. The method of claim 1 wherein the chain extender of the second composition is a combination of water, and said aromatic diamine.

5. The method of claim 1 wherein the chain extender of the second composition comprises a mixture of 3,5-dimethylthio-2,4-toluenediamine and 3,5-dimethylthio-2,6-toluenediamine.

6. The method of claim 1 wherein the reaction mixture comprises from about 0.05 to about 0.50 wt. % tertiary amine and from about 0 to about 0.50 wt. % metal complex provided by the catalyst or catalyst mixture of the second composition.

7. The method of claim 6 wherein the tertiary amine comprises 1,4-diazabicyclo[2.2.2]octane, and the metal complex is selected from the group consisting of dibutyl tin dilaurate; tinoctoate; a titanium complex; and a bismuth complex.

8. The method of claim 1 wherein the nonionic surfactant of the second composition is selected from the group consisting of polydialkylsiloxane; a copolymer of polydialkylsiloxane; polyalkyleneoxide; a copolymer of polyalkyleneoxide; and combinations thereof.

9. The method of claim 1 wherein the blowing agent of the second composition is selected from the group consisting of water, pentane, carbonic acid and combinations thereof.

10. The method of claim 1 wherein the reaction conditions of step (2) include a time of from about 5 to about 20 minutes.

11. The method of claim 1 wherein the weight ratio of first composition to second composition in the reaction mixture is from about 18/82 to about 24/76.

12. The method of claim 1 wherein the reaction mixture comprises from about 70 to about 82 wt. % compound containing a functional group which is reactive with the isocyanate compound of the first composition; from about 0 to about 6.0 wt. % chain extender; from about 0.1 to about 1.0 wt. % catalyst or catalyst mixture; from about 0 to about 1.0 wt. % nonionic surfactant; and from about 0.2 to about 0.4 wt. % water.

13. A cellular elastomeric polyurethane foam ball manufactured by the method which comprises (1) forming a reaction mixture comprising a first composition and a second composition inside a spherical mold, (2) maintaining the reaction mixture inside the mold at reaction conditions including a temperature of from about 60 to about 80° C. for a time sufficient to form a cellular elastomeric polyurethane foam ball inside the mold, (3) removing the formed cellular elastomeric polyurethane foam ball from the mold, and (4) curing the formed cellular elastomeric polyurethane foam ball at a temperature for from about 60 to about 80° C. for a time of from about 60 minutes to about 12 hours, the resulting foam ball having a diameter of from about 59 to about 62 mm, a weight of from about 41 to about 45 g, a bound of from about 150 to about 180 cm when dropped from 254 cm onto horizontal, level concrete, and a forward deformation of from about 5 to about 11 mm, measured by first compressing the ball to a 25.4 mm deformation on each of the three orthogonal axes, then compressing the ball at a rate of 50.8 mm/min until a 1.36 kg load was achieved, increasing the load to 9.53 kg, and measuring the deformation from the 1.36 kg load, said first composition of the reaction mixture comprising at least one isocyanate compound and said second composition of the reaction mixture comprising at least one compound containing a functional group which is reactive with the at least one isocyanate compound of the first composition; a chain extender; at least one catalyst or catalyst mixture comprising a tertiary amine and, optionally, a metal complex, said metal of the metal complex being selected from the group consisting of tin, titanium, zirconium, zinc, bismuth, mercury, iron and combinations thereof; optionally at least one nonionic surfactant; and at least one blowing agent, wherein the chain extender of the second composition comprises an aromatic diamine selected from a group consisting of 3,5-dimethylthio-2,4-toluenediamine; 3,5-dimethylthio-2,6-toluenediamine; diethyltoluene diamine; and combinations thereof.

14. The cellular elastomeric polyurethane foam ball of claim 13 having a weight of from about 41 to about 45 grams; a diameter of from about 59 to about 62 mm; a bound of from about 150 to about 170 cm when dropped from 254 cm onto horizontal, level concrete; a forward deformation of from about 6 to about 8 mm, measured by first compressing the ball to a 25.4 mm deformation on each of the three orthogonal axes, then compressing the ball at a rate of 50.8 mm/min until a 1.36 kg load was achieved, increasing the load to 9.53 kg, and measuring the deformation from the 1.36 kg load: and a return deformation of from about 9 to about 11 mm, measured by first compressing the ball to a deformation of 25.4 mm, reducing the load to 9.53 kg to determine an initial deformation, reducing the load again to 1.36 kg and measuring the difference in deformation.

15. The cellular elastomeric polyurethane foam ball of claim 13 wherein the isocyanate compound of the first composition is selected from the group consisting of methylene diphenylene diisocyanate; dimer, trimer and allophanate of hexamethylene diisocyanate; toluene diisocyanate; trimer of toluene diisocyanate; and combinations thereof.

16. The cellular elastomeric polyurethane foam ball of claim 13 wherein the compound of the second composition containing a functional group which is reactive with the isocyanate compound of the first composition is selected from the group consisting of polytetramethylene ether glycol; alkylene oxide copolymer of ethylene oxide and tetrahydrofuran; polypropylene glycol; polyethylene glycol; and combinations thereof.

17. The cellular elastomeric polyurethane foam ball of claim 13 wherein the chain extender of the second composition is a combination of water and said aromatic diamine.

18. The cellular elastomeric polyurethane foam ball of claim 13 wherein the chain extender of the second composition is comprises a mixture of 3,5-dimethylthio-2,4-toluenediamine and 3,5-dimethylthio-2,6-toluenediamine.

19. The cellular elastomeric polyurethane foam ball of claim 13 wherein the reaction mixture comprises from about 0.05 to about 0.50 wt. % tertiary amine and from about 0 to about 0.50 wt. % metal complex provided by the catalyst or catalyst mixture of the second composition, the metal complex being selected from the group consisting of dibutyl tin dilaurate; tinoctoate; a titanium complex; and a bismuth complex.

20. A tennis ball comprising the cellular elastomeric polyurethane foam ball of claim 14 as a core and felt as covering, said tennis ball having a weight of from 56.70 to 58.47 grams; a diameter of from 65.4 to 68.6 mm; a bound of from 135 to 147 cm when dropped from 254 cm onto horizontal, level concrete; a forward deformation of from 5.59 to 7.37 mm, measured by first compressing the ball to a 25.4 mm deformation on each of the three orthogonal axes, then compressing the ball at a rate of 50.8 mm/min until a 1.36 kg load was achieved, increasing the load to 9.53 kg, and measuring the deformation from the 1.36 kg load; and a return deformation of from 8.89 to 10.8 mm, measured by first compressing the ball to a deformation of 25.4 mm, reducing the load to 9.53 kg to determine an initial deformation, reducing the load again to 1.36 kg and measuring the difference in deformation.

* * * * *